N. WHITEHALL.
Wheel Cultivator.

No. 13,191.

2 Sheets—Sheet 1.

Patented July 3, 1855.

N. WHITEHALL.
Wheel Cultivator.
No. 13,191.
2 Sheets—Sheet 2.
Patented July 3, 1855.
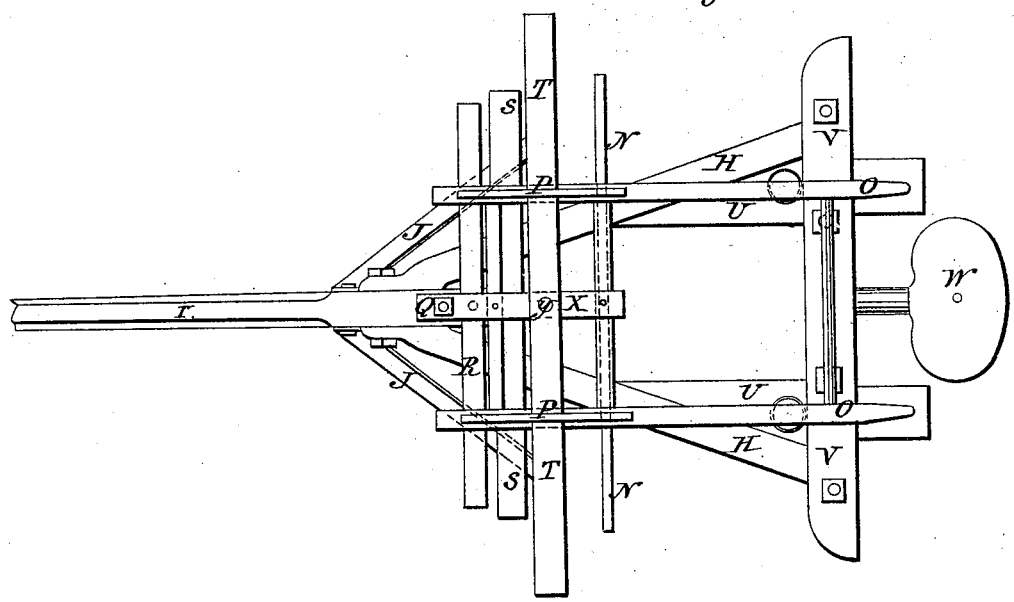
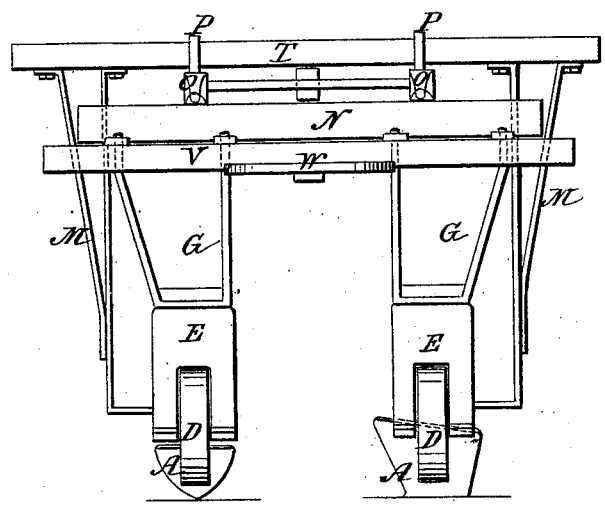

UNITED STATES PATENT OFFICE.

N. WHITEHALL, OF ATTICA, INDIANA.

IMPROVEMENT IN PLOWS.

Specification forming part of Letters Patent No. 13,191, dated July 3, 1855.

*To all whom it may concern:*

Be it known that I, NICHOLAS WHITEHALL, of Attica, Fountain county, State of Indiana, have invented a new and useful Plow; and I do hereby declare that the following is a full, clear, and exact description of the construction and operation of the same, reference being had to the accompanying drawings, making a part of this specification, in which—

Figure 1:
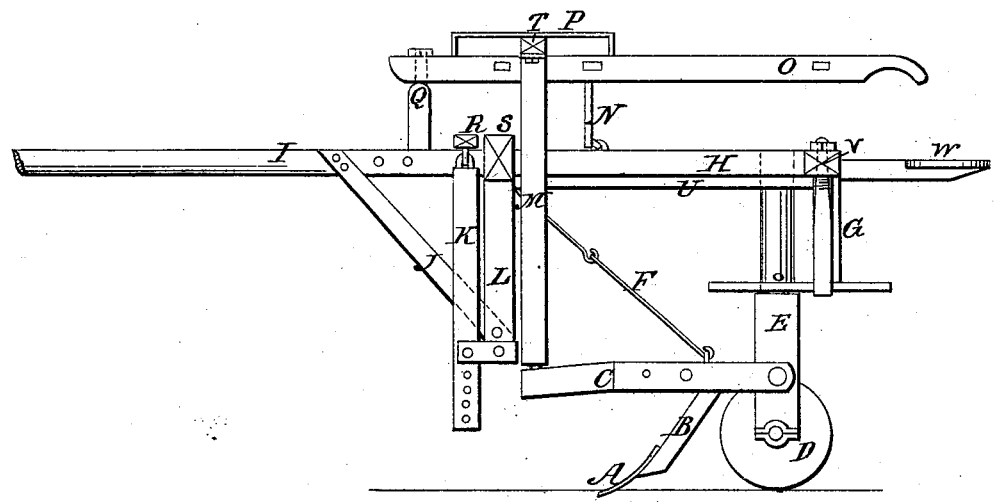
Figure 2:
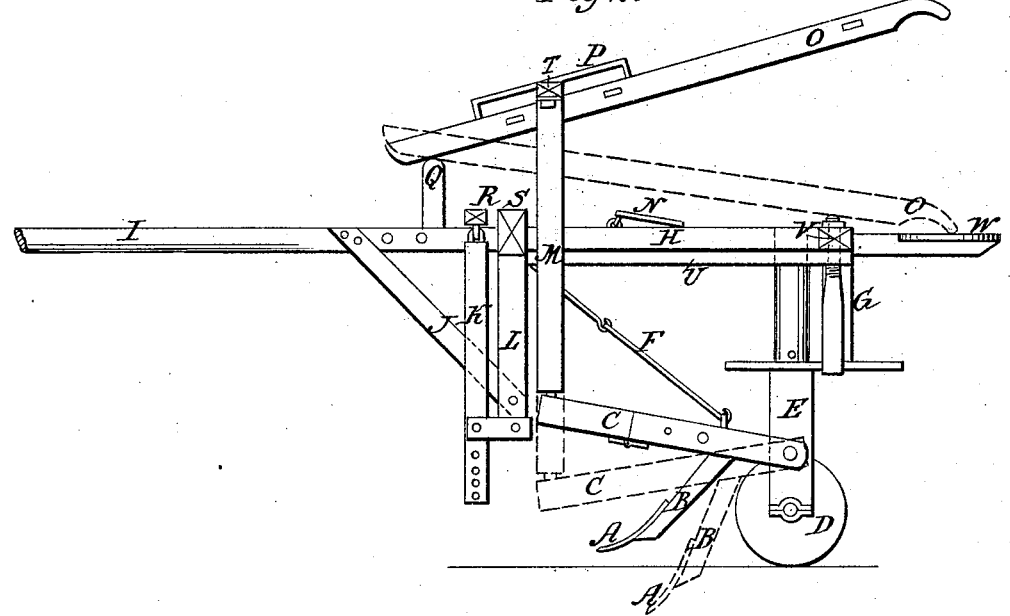

Figure 1 is a side view of the same. Fig. 2 is also a side view of the same. Fig. 3 is a top view of the same. Fig. 4 is a rear view of the same.

Fig. 1, A A represent the plows. B B represent the shanks of the plows. C C represent the beams. D D represent the wheels. E E represent the uprights. F F represent chains connecting with supporters of hounds and beams. G G represent elevators. H H represent the hounds. I represents the tongue. J J represent braces supporting tongue and arms behind double-tree L L. K K represent arms of double-trees. L L represent arms behind double-trees. M M represent arms and braces attached to cross-piece T T and resting on handle and lever; N, slide for regulating depth of plows; O O, handles. P P represent iron guides for lateral play of cross-piece T T on the handles O O. Q Q represent fulcrum.

Fig. 3, R represents double-tree attached to arms K K, Figs. 1 and 2. S S represent cross-piece behind double-tree, to which arms L L, Fig. 1, are attached. T T represent cross-piece resting on handles O O, and held upon handles O O by guide P P. U U represent supporters of hounds resting on elevators G G. V V represent cross-piece regulating the setting of the plows so as to cut a wider or narrower furrow. W represents seat for the plowman. X represents lever acting in connection with handles O O. Y represents a pivot connecting the cross-piece and lever.

The same letters refer to like parts in all the figures.

The nature of my invention consists in so constructing a plow that the driver can be seated on the seat W at the end of the handles O O, and by the action of said handles and by exerting thereon a very slight power the said plowman can with the utmost ease regulate the action and motion of the plows, as circumstances may require, by means of the appliances thereunto attached and hereinafter described.

The plows are made in the ordinary manner, with the exception of the landsides, the wheels supplying the place of the landsides. By raising the handles O O of the plows A A a lesser depth is given to the plows, or they may be lifted six or more inches above the surface of the ground to avoid any obstruction that it is deemed advisable to avoid, and by lowering the handles a greater depth is attained, which can be accomplished in this manner to any extent desirable in the heaviest kinds of plowing. Complete control is given likewise to lateral motions of the plows, by means of the action of handles O O to the right or left hand under the cross-piece T T, and rendered regular in their lateral motions by said cross-piece T T and guides P P. This arrangement is very advantageous, as it gives the plowman power to change the course of the plows in a moment, either for the purpose of cutting a wider or narrower furrow or avoiding obstructions or to prevent injuring the crop under cultivation, such as in plowing corn or any other production requiring cultivation. By turning the handles of the plow O O to the right hand or the left a corresponding motion is imparted to the plows and this instantaneously. By letting down the slide N N it permits the plows to enter the soil to a proper depth when the wheels are not in the furrow. When the wheels D D come into the furrow (the wheels D D being intended to follow immediately after and in a line with the plows) the slide N N is to be raised for the purpose of permitting the plows to enter the regular and proper depth which they will maintain while in such position.

The uprights E E have attached to them the wheels D D and the beams C C, which are operated on by the action of the handles.

The chains F F are attached to the supporters of the hounds H H immediately under the front cross-piece, S S, and at their lower termination are attached to the beam C C and directly over the shanks B B. The office of these chains is to pull the plows, and fastened as they are they enable the plows to have all the motions above described, and yield to the said, all necessary action to accomplish the purposes designed.

K K represent the arms of the double-tree, which said arms K K are attached by means of a clevis to the arms L L of the cross-piece, which arms L L extend down about two-thirds of the length of arms K K. The motive power is applied to the plow by means of arms K K.

Disclaiming all the devices separately considered, I claim—

The arrangement and connection of the handles O O, arms M M, plow-beams C C, and seat W, for the purpose of operating plows in the manner and for the purpose set forth.

In testimony whereof I have hereunto subscribed my name in presence of two subscribing witnesses.

NICHOLAS WHITEHALL.

Witnesses:
 JOHN J. TAYLOR,
 Dr. S. R. HURD.